H. A. SCHLEIDEN.
VALVE GRINDING TOOL.
APPLICATION FILED JAN. 17, 1916.

1,208,023.

Patented Dec. 12, 1916.

WITNESSES:
Arthur J. Farnsworth.
Anna E. Flanagan

INVENTOR:
Harold A. Schleiden

UNITED STATES PATENT OFFICE.

HAROLD A. SCHLEIDEN, OF LOS ANGELES, CALIFORNIA.

VALVE-GRINDING TOOL.

1,208,023.

Specification of Letters Patent. Patented Dec. 12, 1916.

Application filed January 17, 1916. Serial No. 72,494.

*To all whom it may concern:*

Be it known that I, HAROLD A. SCHLEIDEN, a citizen of the United States, residing at Los Angeles, in the county of Los Angeles and State of California, have invented a new and useful Valve-Grinding Tool, of which the following is a specification.

My invention relates to improvements in valve grinding tools in which the direction of rotation of the valve that is being ground is periodically reversed; and the objects of my improvement are, first, to provide means whereby a continuous circular movement of the operating handle in one direction will, automatically, rotate the valve first in one direction and then in the other direction; second, to secure such relative movement of the valve in the respective directions of rotation that, at the end of any rotative period, the valve will not be in the same angular position it was in at the beginning of the previous rotation in the opposite direction; and, third, to eliminate the possibility of the gear mechanism getting out of position for proper meshing at the time of reversal of the direction of rotation of the valve. I attain these objects by the mechanism illustrated in the accompanying drawing, in which—

Figures 1, 2:
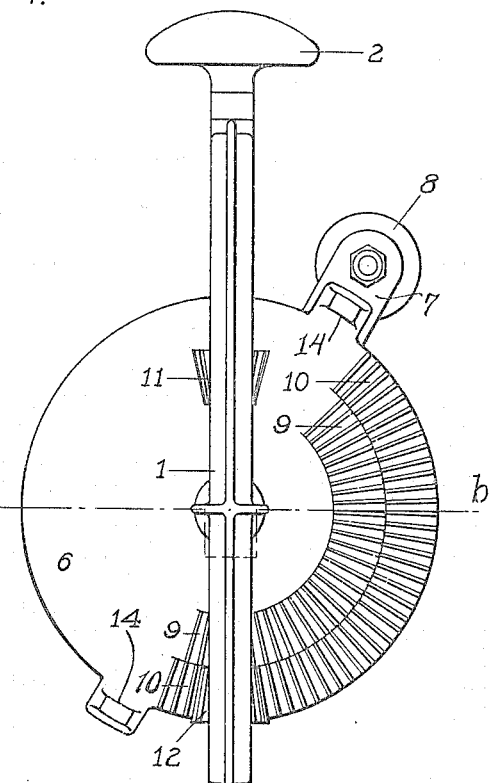
Figure 3:
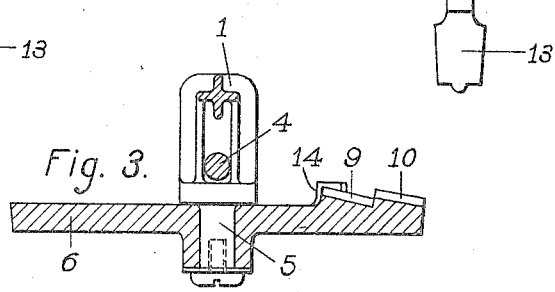

Figure 1 is a vertical front view of the tool in the position for use; Fig. 2, a vertical side view; Fig. 3, a horizontal section on the line *a b*, Fig. 2; and Fig. 4, a diagram illustrating the action of the locking mechanism which insures the proper reëngagement of the gears at the time of reversal of the direction of rotation of the valve.

Similar numbers refer to similar parts throughout the several views.

The frame of the tool 1, carries, at its upper extremity, a rigidly mounted gripping handle 2; two bearings 3, for the tool shaft 4; and a trunnion 5, on which the driving gear 6 revolves.

Attached to the driving gear 6 is a suitable arm 7, which is provided with a loose turning handle 8, through which the tool is operated. The driving gear 6, has two concentric partial sets of bevel gear teeth shown at 9 and 10, which engage, alternately, with bevel pinions 11 and 12 respectively. The circular lengths and the relative positions of the sets of teeth 9 and 10, are such that it is impossible for both pinions, 11 and 12, to be engaged at the same time. Gear teeth 10, for example, must have passed beyond pinion 12, and become disengaged therefrom, before it is possible for gear teeth 9 to engage the teeth of pinion 11.

Bevel pinions 11 and 12 are firmly fixed on shaft 4 in such relative angular positions that, provided there is no angular displacement of the pinions with reference to frame 1 during the time when neither pinion is engaged with its gear, the pinion to become engaged will be in correct angular position to receive its oncoming gear.

It is evident that during the time that both pinions are dis-engaged from their gears, any angular displacement of the pinion shaft, relative to the frame, will result in the pinion which is next to become engaged not being in proper position to receive its oncoming gear. Such angular displacement, unless prevented by suitable means, might be caused by a slight twist of the tool as a whole at the moment that both pinions are out of mesh. The result might be breakage of the teeth, or other parts of the tool, or stoppage of its operation. It is therefore essential to secure the maintenance of proper angular position of the pinion shaft with reference to the frame, at the time of the reversal of its motion, when both pinions are dis-engaged. I secure such locking of the pinions with reference to the frame, during the time of their dis-engagement, by means of a suitable cam, or cams, 14, mounted upon the driving gear 6, and acting upon plane surfaces, or surface, parallel to the axis of the pinion shaft, and revolving with the latter. The principle is illustrated in the diagram, Fig. 4, in which 14 is the cam, and 15 is the revolving plane surface acted upon by it. If the driving gear 6, is moving in the direction of the arrow, it is evident that its teeth have been engaged, but are just passing out of mesh with the driven pinion, at the point 16. It is essential that, from this time on, the pinion shaft maintains this angular position with reference to the frame, until the last tooth of the gear has passed out from under, and cleared the teeth of the pinion, and until the other gear of wheel 6 is ready to engage its pinion, which is mounted on the same shaft as the one under consideration.

It is evident that while wheel 6 has been moving in the direction of the arrow, the cam 14, and the plane surface 15 have been coming closer together and approaching parallelism. At the position shown in Fig.

4, the last driving tooth of gear 6 is passing out of engagement with the pinion, and the revolving plane surface and the upper plane surface of the cam have become parallel and close together, if not in actual contact. No further movement of the pinion can now take place until the last tooth of the driving gear has passed out from under, and cleared the teeth of the pinion. The pinion will then be free to reverse its motion, but not to continue in the same direction.

Figure 4:
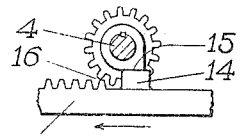

When one of the pinions is in the position shown in Fig. 4, the other is just ready to enter into mesh with its gear. The other gear occupies, in fact, a position with respect to its pinion exactly similar to that shown in Fig. 4, except that the teeth are entering instead of leaving engagement, and the direction of motion is the reverse of that shown by the arrow. By the time the first tooth of the incoming gear comes in contact with the tooth of its pinion, the last tooth of the outgoing gear will have passed beyond, and cleared the teeth of its pinion, allowing the latter to reverse its motion freely.

In the operation of this tool it is evident that a continuous movement of the operating handle 8, will result in alternately rotating the shaft 4, first in one direction and then in the other. Moreover it is apparent that, if the two driven pinions have the same pitch diameter, the amount of rotation of shaft 4 in one direction will exceed that in the other, due to the different radii of the driving gears. The proportions of the parts will be so arranged that the valve to be ground will first be rotated a certain number of revolutions in one direction, and then rotated a different, and fractional multiple of this number of revolutions in the opposite direction. In this way the valve will occupy a different angular position at every reversal, from that it occupied at the moment of the previous reversal. It is well known that this method of grinding will give better results than either continuous rotation in one direction, or alternate rotation in each direction where the amount of travel in one direction is the same, or an even multiple of the travel in the other.

The desired results just described can be accomplished with the mechanism I have disclosed, without danger of improper meshing of the gears at the moment of reversal of the direction of rotation. Shaft 4 carries at its lower end, means for attaching suitable working blades or tools, which engage with the valve to be ground.

I am aware that prior to my invention, valve grinding tools have been made to give a periodical reversal of the direction of rotation of the valve that is being ground. I therefore do not claim such a combination broadly; but

I claim:

1. The combination, in a valve grinding tool, of a driving gear carrying two concentric sets of bevel gear teeth, each of said sets of teeth having a circular length of less than one half of a complete circle, one of said sets of teeth subtending a central angle which is greater by a fractional multiple, and includes the central angle subtended by the other of said sets of teeth; a pair of bevel pinions mounted upon a tool carrying shaft in such a manner that they will alternately mesh with their respective sets of teeth on said driving gear; and a pair of cams located upon said driving gear and adapted to meet, periodically, a follower located upon said tool carrying shaft in such a manner that the mutual action of the cams and follower upon each other will result in maintaining said pinions in correct angular position for reëngagement with their respective gears during the period preceding the reversal of their angular motion, and when neither of said pinions is engaged with its respective gear.

2. The combination, in a valve grinding tool, of two concentric driving gears, each set subtending an arc of less than 180 degrees; two corresponding pinions rigidly mounted upon the same shaft in such relative positions that a continuous rotation of the driving gears in one direction will give the driven shaft a rotation, first in one direction, and then in the other; and means for maintaining the driven shaft, after the dis-engagement of one of the sets of gears, in correct position for the engagement of the other set of gears; all substantially as shown.

3. In a valve grinding tool, arranged to impart by means of toothed gearing a periodically reversed rotation to a driven shaft as the result of a continuous rotation of the driving gear in one direction; a pair of cams located upon the driving gear in such positions as to meet, periodically, a follower located upon the driven shaft, the mutual action of said cams and said follower upon each other being such as to maintain the said driven shaft in correct angular position for reëngagement of said gearing during the period preceding the reversal of motion of said driven shaft, when said gearing is out of mesh.

HAROLD A. SCHLEIDEN.

Witnesses:
ARTHUR J. FARNSWORTH,
ANNA E. FLANAGAN.